Feb. 5, 1952 W. A. OLSON 2,584,494
PERISHABLE PRODUCT PROCESSING CABINET
Filed Feb. 10, 1950 2 SHEETS—SHEET 2
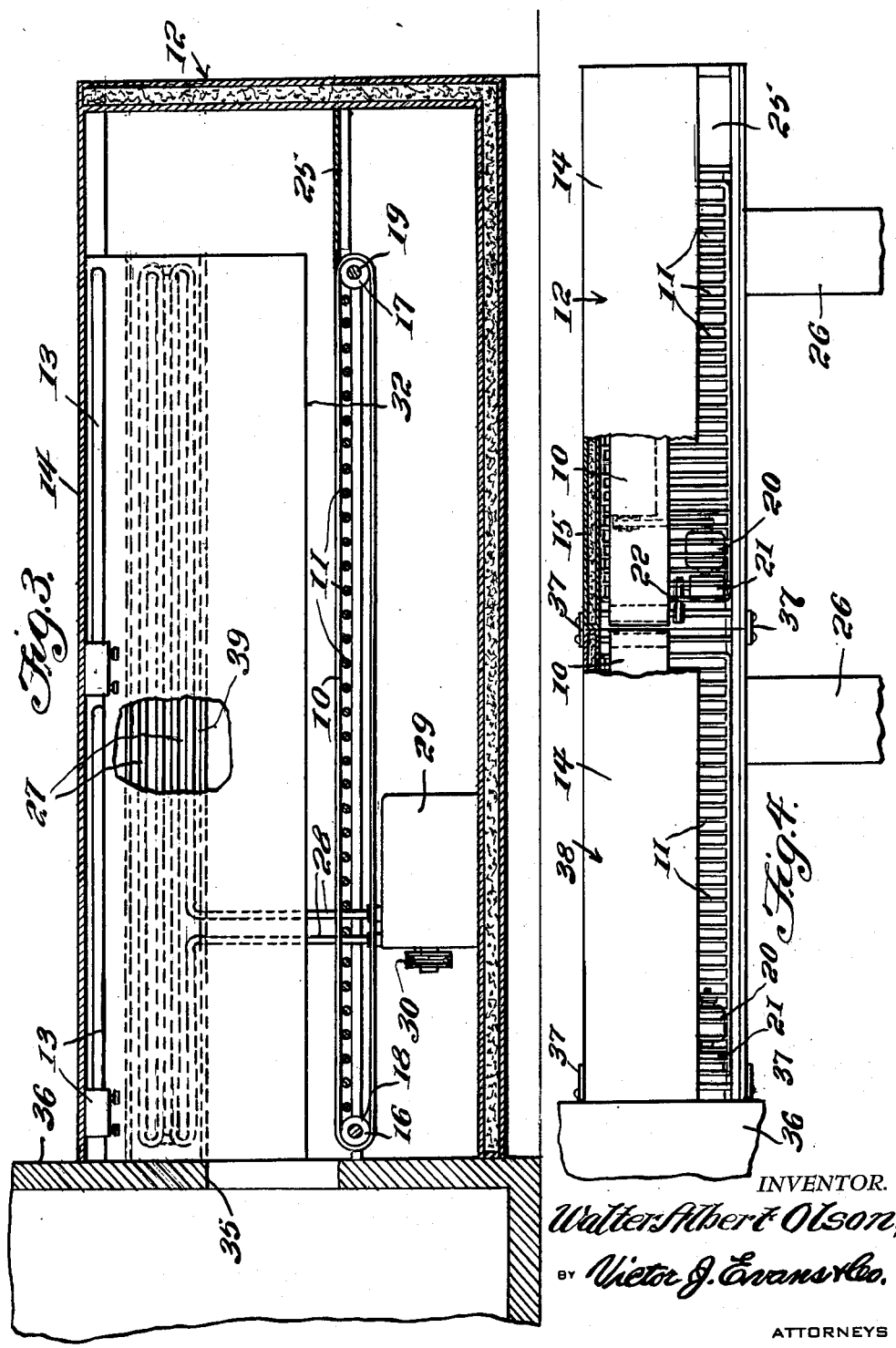
INVENTOR.
Walter Albert Olson,
BY Victor J. Evans & Co.
ATTORNEYS Patented Feb. 5, 1952

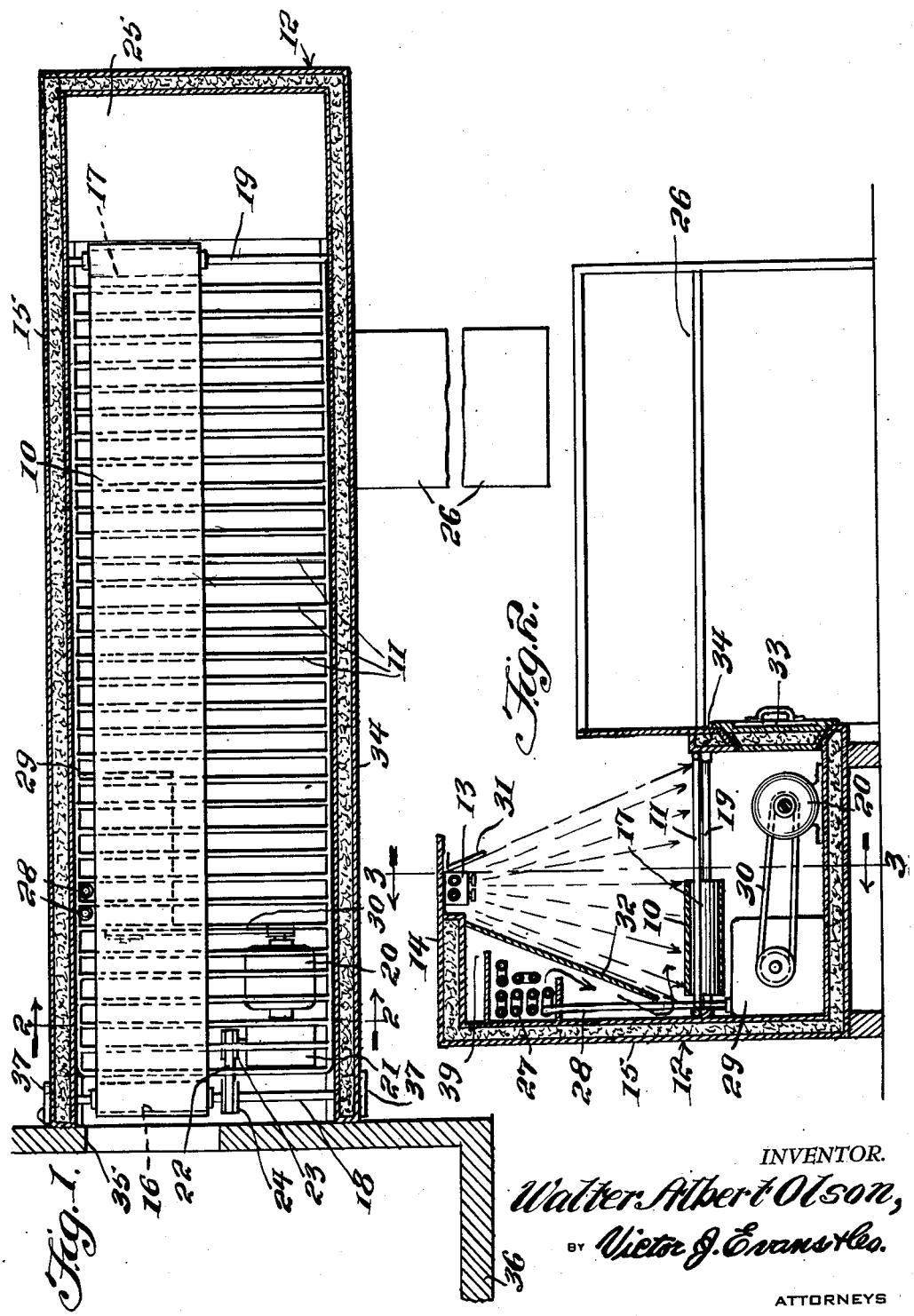

2,584,494

UNITED STATES PATENT OFFICE 2,584,494

PERISHABLE PRODUCT PROCESSING CABINET

Walter A. Olson, Kendall, Fla.

Application February 10, 1950, Serial No. 143,515

5 Claims. (Cl. 62—89.5)

This invention relates to the processing of fresh cut meat and other perishable products where constant temperature is necessary to maintain freshness and bloom of the products and where products are subjected to bacterial infestations in the processing thereof, and in particular the invention relates to a cabinet having a conveyor belt traveling across temporary storage area with germicidal lamps positioned to irradiate products on the belt and in the area and with the belt positioned to receive products from a cutting room and deliver products to a slide-off tray with weighing and wrapping counters positioned intermediate of the length of the belt.

The purpose of this invention is to provide means whereby cut meats and other perishable products are maintained at a constant cool temperature in weighing, wrapping and other processing thereof.

It is generally recognized that it is necessary to maintain a constant cool temperature for the packaging of fresh cut meats and the processing of similar products and it is also generally recognized that infesting of bacteria on the fresh cut meats and other products prior to wrapping is an important factor in maintaining quality. With this thought in mind this invention contemplates a processsing cabinet having an open refrigerated area positioned above a refrigerated storage compartment with a conveyor belt traveling over a slat table with a slide-off tray at the end of the conveyor, with weighing and wrapping counters extended from the side of the cabinet, and with a hood having germicidal lamps suspended from the under surface positioned over the conveyor.

The object of this invention is, therefore, to provide means for constructing a processing cabinet whereby cut meats and similar perishable products may be processed at a constant cool temperature.

Another object of the invention is to provide a processing cabinet for cut meats and the like in which a storage area is provided at the side of a conveyor belt to accommodate a back log of products that may be left in the cabinet waiting to be weighed or wrapped or that may be returned to the conveyor to be continued to another station or to the end thereof.

A further object of the invention is to provide a constant temperature processing cabinet for weighing, wrapping, and processing cut meats and other products which is of a simple and economical construction.

With these and other objects and advantages in view the invention embodies an elongated rectangular shaped open cabinet with a conveyor extended over a substantially open platform over a cool storage compartment and with a hood having germicidal lamps therein extended over the conveyor and platform.

Other features and advantages of the invention will appear from the following description taken in connection with the drawings wherein:

Figure 1 is a sectional plan through the cabinet taken above the horizontally disposed platform thereof.

Figure 2 is a cross section through the cabinet taken on line 2—2 of Figure 1.

Figure 3 is a longitudinal section through the cabinet taken on line 3—3 of Figure 2.

Figure 4 is a plan view of the cabinet on a reduced scale with parts broken away showing sections of cabinets in abutting relation.

Referring now to the drawings wherein like reference characters denote corresponding parts the cool processing cabinet of this invention includes a conveyor 10 positioned over a platform formed with slats 11 in a rectangular shape box-like casing 12 with germicidal lamps 13 carried by an overhanging shelf 14 extended from the upper end of a rear wall 15.

The conveyor 10 is formed with an endless belt trained over pulleys 16 and 17 with the pulley 16 mounted on a head shaft 18 and the pulley 17 mounted on a tail shaft 19. The shaft 18 is driven by a motor 20 through a reduction gear box 21 by a belt 22 trained over pulleys 23 and 24.

The slats 11 extend through the belt as shown in Figures 1 and 2 and products waiting to be processed are removed from the belt and placed upon the slat. A slide-off tray 25 is positioned at the far end of the conveyor and surplus products that have not been removed from the conveyor are deposited upon this tray.

Weighing and wrapping counters 26 which extend outwardly from the sides of the cabinet are removable and may be positioned at any suitable point or points or may be removed.

Cooling coils 27 are positioned in the upper part of the hood and under the shelf 14 and these coils are connected by pipes 28 to a refrigerating element or compressor 29 that may be positioned either in the cabinet or outside thereof and which, in the design shown, is driven from the motor 20 by the belt 30.

A shield 31 is positioned over the lamps 13 to protect operators of the unit and a panel 32 may extend from the intermediate part of the shelf downwardly to the inner surface of the rear wall 15 of the cabinet, as illustrated in Figure 2.

The lower part of the cabinet, below the slats 11 provides a cool storage chamber and refrigerator doors 33 are provided in the front wall 34 thereof.

With the parts arranged in this manner the cabinet is positioned with the conveyor 10 on the outside of a window or door 35 of a cutting room 36 so that products from the room may be placed upon the conveyor and, as illustrated in Figure 4 sections of the cabinet may be connected by splicing plates 37. The inner unit 38 of the cabinet is similar to the unit illustrated in Figure 1 except that the slide-off tray at the end of the conveyor is omitted.

The cool storage compartment in the lower part of the cabinet is cooled by air from the refrigerated compartment 39 in the upper part of the hood, the cool air from this compartment passing downwardly as indicated by the arrows and passing into the storage chamber and also over the conveyor platform formed by the slats 11. By this means the constant cool temperature is provided over the processing cabinet and cut meats and other products thereon are subjected to the rays of the germicidal lamps so that it is substantially impossible for products processed in the cabinet to be infested with bacteria and the like.

It will be understood that modifications may be made in the design and arrangement of the parts without departing from the spirit of the invention.

What is claimed is:

1. A perishable product processing cabinet comprising a box-like casing having an upwardly extended rear wall with an overhanging hood carried by the said rear wall, an open slat platform extended across the casing, a conveyor in the casing with the upper section thereof positioned to travel over the slats of the platform, a slide-off tray positioned at the end of the conveyor for receiving products therefrom, refrigerating means in the cabinet for maintaining a constant cool temperature therein, and germicidal lamps carried by the overhanging hood of the rear wall and positioned with rays therefrom directed upon the conveyor and platform.

2. A perishable product processing cabinet comprising a box-like casing having an upwardly extended rear wall with an overhanging hood carried by the said rear wall, an open slat platform extended across the casing, a conveyor in the casing with the upper section thereof positioned to travel over the slats of the platform, a slide-off tray positioned at the end of the conveyor for receiving products therefrom, refrigerating means in the cabinet for maintaining a constant cool temperature therein, germicidal lamps carried by the overhanging hood of the rear wall and positioned with rays therefrom directed upon the conveyor and platform, and weighing and wrapping counters positioned at the sides of the casing and extended therefrom.

3. A perishable product processing cabinet comprising a box-like casing having an upwardly extended rear wall with an overhanging hood carried by the said rear wall, an open slat platform extended across the casing, a conveyor in the casing with the upper section thereof positioned to travel over the slats of the platform, a slide-off tray positioned at the end of the conveyor for receiving products therefrom, refrigerating coils positioned in the hood of the rear wall of the cabinet, said hood having openings in the lower part thereof providing communicating means thereof with a storage chamber below the platform, and germicidal lamps carried by the overhanging hood of the rear wall and positioned with rays therefrom directed upon the conveyor and platform.

4. A perishable product processing cabinet comprising a box-like casing having an upwardly extended rear wall with an overhanging hood carried by the said rear wall, an open slat platform extended across the casing, a conveyor in the casing with the upper section thereof positioned to travel over the slats of the platform, a slide-off tray positioned at the end of the conveyor for receiving products therefrom, refrigerating coils positioned in the hood of the rear wall of the cabinet, said hood having openings in the lower part thereof providing communicating means thereof with a storage chamber below the platform, germicidal lamps carried by the overhanging hood of the rear wall and positioned with rays therefrom directed upon the conveyor and platform, and doors in the front wall of the casing providing access to the area below the platform and conveyor.

5. In a perishable product processing cabinet, the combination of which comprises an elongated rectangular shaped casing having a horizontally disposed slat platform with the upper part of the casing above the platform open at the front and with the rear walls of the casing extended upwardly, a forwardly extended shelf carried by the upper end of the rear wall of the casing providing an overhanging hood, germicidal lamps positioned in the under surface of the said overhanging hood and mounted whereby rays therefrom are directed upon the platform, a shield extended downwardly from the overhanging hood substantially covering the germicidal lamps, a belt conveyor mounted in the casing with the upper section of the belt positioned over the platform and with the lower section thereof positioned below the platform, refrigerant coils positioned in the hood, said hood having openings in the lower part thereof providing communicating means between the interior of the hood and the interior of the section of the casing below the platform, a receiving tray positioned in the platform at the end of the conveyor, weighing and wrapping counters extended therefrom the side of the casing and removable therefrom, and means operating the conveyor.

WALTER A. OLSON.

REFERENCES CITED

The following references are of record in the file of this patent:

UNITED STATES PATENTS

| Number | Name | Date |
|---|---|---|
| 1,911,913 | Mayor | May 30, 1933 |
| 1,955,669 | Botz | Apr. 17, 1934 |
| 2,502,163 | Maas | Mar. 28, 1950 |